United States Patent
Stehle et al.

(10) Patent No.: US 10,844,953 B2
(45) Date of Patent: Nov. 24, 2020

(54) TRANSMISSION CONTROL SYSTEM

(71) Applicant: ZF Friedrichshafen AG, Friedrichshafen (DE)

(72) Inventors: Harald Stehle, Tettnang (DE); Peter Schiele, Kressbronn (DE); Günther Maier, Meckenbeuren (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/250,299

(22) Filed: Jan. 17, 2019

(65) Prior Publication Data
US 2019/0219158 A1    Jul. 18, 2019

(30) Foreign Application Priority Data

Jan. 18, 2018    (DE) .......................... 10 2018 200 776

(51) Int. Cl.
*F16H 61/04* (2006.01)
*F16H 61/02* (2006.01)
(Continued)

(52) U.S. Cl.
CPC ..... *F16H 61/0403* (2013.01); *F16H 61/0213* (2013.01); *F16H 3/66* (2013.01);
(Continued)

(58) Field of Classification Search
None
See application file for complete search history.

(56) References Cited

U.S. PATENT DOCUMENTS

| | | | | |
|---|---|---|---|---|
| 4,969,098 A | * | 11/1990 | Leising | ................. F16H 61/061 477/150 |
| 5,220,493 A | * | 6/1993 | Knittler | ............... H02M 7/7575 363/35 |
| 6,149,547 A | | 11/2000 | Oba et al. | |
| 8,868,307 B2 | | 10/2014 | Jeon | |
| 2006/0100060 A1 | * | 5/2006 | Kraska | .................. B60K 6/405 477/156 |

(Continued)

FOREIGN PATENT DOCUMENTS

| DE | 19917575 A1 | 10/2000 |
|---|---|---|
| DE | 102006002122 A1 | 7/2007 |

(Continued)

OTHER PUBLICATIONS

German Search Report DE102018200776.4 dated Oct. 4, 2018. (10 pages).

(Continued)

*Primary Examiner* — Justin Holmes
(74) *Attorney, Agent, or Firm* — Dority & Manning, P.A.

(57) ABSTRACT

A gearbox (100) includes an input shaft (105) and a first and a second proportionally controllable shift element (A to F). The shift elements (A to F) are configured to control, by way of an open-loop system, engagement or disengagement of a gear ratio in the gearbox (100). A method (200) for the open-loop control of the gearbox (100) includes: determining a specified differential speed profile that is a profile of a difference between a rotational speed of the input shaft (105) and a synchronous speed of a gear ratio to be engaged; and determining a torque demand of a drive source connected to the input shaft (105) or determining a control profile for the one of the first and second shift elements (A to F) to be engaged in the gear ratio on the basis of the specified differential speed profile.

9 Claims, 3 Drawing Sheets

(51) Int. Cl.
   *F16H 59/46* (2006.01)
   *F16H 61/686* (2006.01)
   *F16H 59/42* (2006.01)
   *F16H 3/66* (2006.01)

(52) U.S. Cl.
   CPC .............. *F16H 59/42* (2013.01); *F16H 59/46* (2013.01); *F16H 61/686* (2013.01); *F16H 2061/0474* (2013.01); *F16H 2200/0065* (2013.01); *F16H 2200/2012* (2013.01); *F16H 2200/2041* (2013.01); *F16H 2200/2046* (2013.01); *F16H 2200/2064* (2013.01); *F16H 2200/2094* (2013.01)

(56) References Cited

U.S. PATENT DOCUMENTS

2007/0167284 A1  7/2007  Steinhauser et al.
2019/0219156 A1* 7/2019  Stehle .................. F16H 61/686

FOREIGN PATENT DOCUMENTS

DE   102011055926  A1   12/2012
DE   102012222366  A1   6/2014

OTHER PUBLICATIONS

German Search Report DE102018200777.2 dated Sep. 18, 2018. (10 pages).
German Search Report DE102018200779.9 dated Sep. 5, 2018. (10 pages).

* cited by examiner

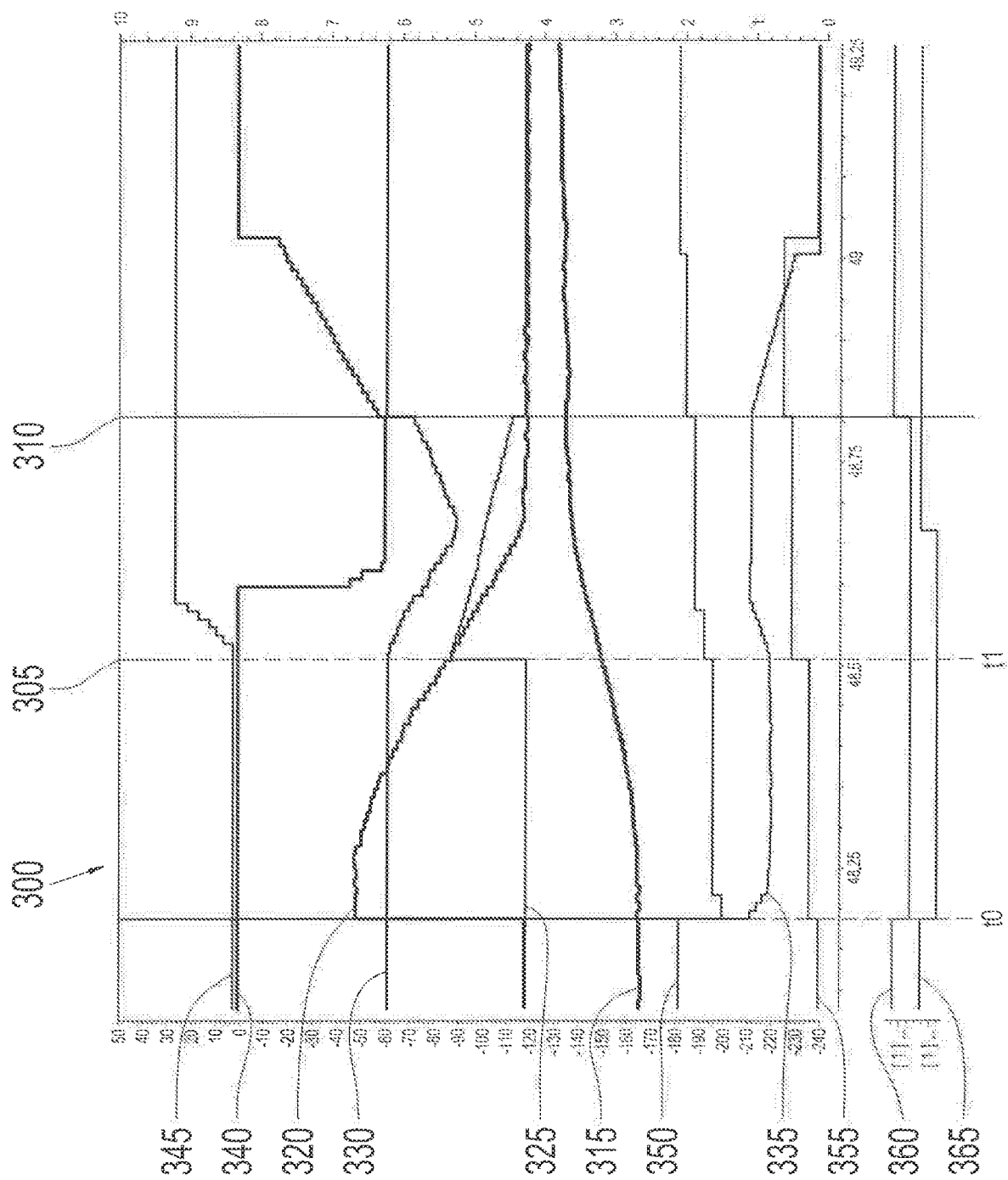

TRANSMISSION CONTROL SYSTEM

FIELD OF THE INVENTION

The present invention relates generally to a transmission control. In particular, the present invention relates to the open-loop control of a gearbox for use in a motor vehicle.

BACKGROUND

A motor vehicle includes a drive train which includes a prime mover or drive source, a gearbox, and a driving wheel. Different gear steps or ratios may be engaged in the gearbox in order to adapt a rotational speed of the prime mover to a rotational speed of the driving wheel. The gearbox includes multiple gear sets which may be differently configured and combined with the aid of shift elements. A control device controls the shift elements by way of an open-loop system and, in this way, determines which gear ratio is engaged, i.e., which step-down ratio (or step-up ratio) is present between an input side and an output side of the transmission, and determines with the aid of which gear sets in which configuration the step-down ratio is achieved. During a changeover from one gear ratio into another gear ratio, usually at least one shift element is disengaged and another shift element is engaged in order to achieve a changeover which is as smooth as possible.

An influencing of a torque of the prime mover brought about by the control device or the implementation of a control profile in the form of an actuation of a shift element may be subjected to a delay, and so, under certain conditions, the gear ratio to be engaged cannot be activated at the suitable synchronous speed. Usually, changeovers or activations are determined in such a way that the changeovers or activations are completed by a predetermined amount of time before the synchronous speed of the gear step to be engaged is reached, in order to allow for a delayed implementation.

One problem addressed by the invention is that of providing an improved technique for synchronizing a gearbox during a changeover of an engaged gear ratio.

SUMMARY OF THE INVENTION

A gearbox includes an input shaft and a first and a second proportionally controllable shift element. The shift elements may control, by way of an open-loop system, the engagement or disengagement of a gear step in the gearbox. A method for the open-loop control of the gearbox includes determining a specified differential speed profile as the profile of a difference between a rotational speed of the input shaft and a synchronous speed of a gear ratio to be engaged; and determining a torque demand of a prime mover connected to the input shaft or a control profile for a shift element to be engaged on the basis of the specified differential speed profile.

In contrast to a known open-loop control, the gearbox may be synchronized in an improved way, in order to activate the gear ratio to be engaged. In this case, the gear ratio to be engaged may be associated with a shift element which operates in a form-fit manner, for example, as a dog clutch, i.e., cannot operate with variable slip. The shift element controlled by way of an open-loop system may be intended for engagement, in particular, within the scope of a gear ratio changeover. The synchronization may be advantageously applied, in particular, during downshifting from a higher gear ratio into a lower gear ratio. The specified differential speed profile may be determined, for example, as a linear ramp having a target value of zero. A starting value of the specified differential speed profile may be determined from existing rotational speeds at the gearbox.

The specified differential speed profile may be determined with respect to a predetermined slip time. In this case, the slip time may be checked multiple times during the open-loop control and may be changed, if necessary. The slip time indicates the length of time during which one or both shift elements is/are held in the slip condition. The longer the slip time is, the longer both gear ratios may be active simultaneously during a gear step changeover. In one further embodiment, a specified differential speed profile may be determined, which has a shape which is non-linear, for example, is asymptotic, logarithmic, or polynomial.

The open-loop control may take place, in particular, in such a way that an actual differential speed profile, which includes a profile of a difference between the rotational speed of the input shaft and the synchronous speed, corresponds as closely as possible to the specified differential speed profile. In other words, it is preferred when an open-loop control of the actual differential speed profile to the specified differential speed profile takes place by influencing the drive torque or the control profile of a shift element.

The torque demand and the control profile may be advantageously determined with respect to different further control parameters. A control parameter may be variably weighted, in particular, depending on a closed-loop control deviation.

Usually, an influencing of only one of the control values takes place, i.e., either the torque demand or the control profile. A decision regarding which control value is to be influenced may be reached on the basis of a torque to be transmitted. For example, in the case of a coasting downshift with an engaging dog clutch, an influencing of the torque demand may be selected, while, in general, in a low load range and in a moderate load range, preferably one control profile of one shift element or both shift elements is selected. A shift element disengaging within the scope of a gear ratio changeover may be protected against an overload with the aid of an influencing of the torque demand. In one further example, it may be decided, depending on the situation, whether the torque demand, the engaging shift element, or the disengaging shift element is to be influenced. In one embodiment, the type of the influencing may even be changed during a gear ratio changeover, for example, when the torque to be transmitted changes. Threshold values, on the basis of which a determination is made regarding which type of influencing is carried out, may be contained in a table. In one embodiment, separate tables may be provided for the influencing of the torque demand and for the influencing of the gear change profile. Each table may include threshold values which indicate the torque range within which the associated influencing is permitted or preferred.

The torque demand or the control profile may also be determined with respect to one further control parameter which is determined as a function of a temperature of the gearbox. In particular, the temperature of a fluid, namely an oil, circulating in the gearbox may be taken into account. The control parameter may be determined with the aid of a predetermined characteristic curve on the basis of the temperature.

In a similar way, the torque demand or the control profile may also be determined with respect to one further control parameter which is determined as a function of a torque to be transmitted. A characteristic curve may also be utilized in this case for the determination. It is further preferred when a characteristic map is utilized for the determination of the control parameter both as a function of the temperature and as a function of the torque.

The open-loop control may begin once it has been determined that a start condition for an open-loop control, which holds the gearbox at a synchronization point, has been met. Such an open-loop control is known by the designation HINSYN ("hold in synchronization"). The start of the open-loop control as a function of the start condition may take place regardless of whether the HINSYN open-loop control is actually used.

The determination of the output parameter may be terminated when the target synchronous speed has been reached. Optionally, the determination may be terminated only when the synchronous speed has been held for a predetermined time. In one variant, the determination of the output parameter may be terminated when the engaging form-fit shift element has been engaged. Due to the event-controlled termination, the synchronization may be maintained, in an improved way, for as long as necessary.

A device for the open-loop control of a gearbox that includes an input shaft, and a first and a second proportionally controllable shift element The device includes an interface for connection to one of the shift elements or an interface for connection to a prime mover which is connected to the input shaft; and a processing unit. In this case, the processing unit is configured for determining a specified differential speed profile as a profile of a difference between a rotational speed of the input shaft and a synchronous speed of a gear step to be engaged; and a torque demand of the prime mover or of a control profile for the shift element, on the basis of the specified differential speed profile.

The device may be utilized for carrying out the method described herein. Advantages or features of the method may be transferred to the device, and vice versa.

BRIEF DESCRIPTION OF THE DRAWINGS

The invention will now be described more precisely with reference to the attached figures, in which:

FIG. 3 shows exemplary profiles with respect to a gearbox during a changeover of an engaged gear step.

DETAILED DESCRIPTION

Figure 1:
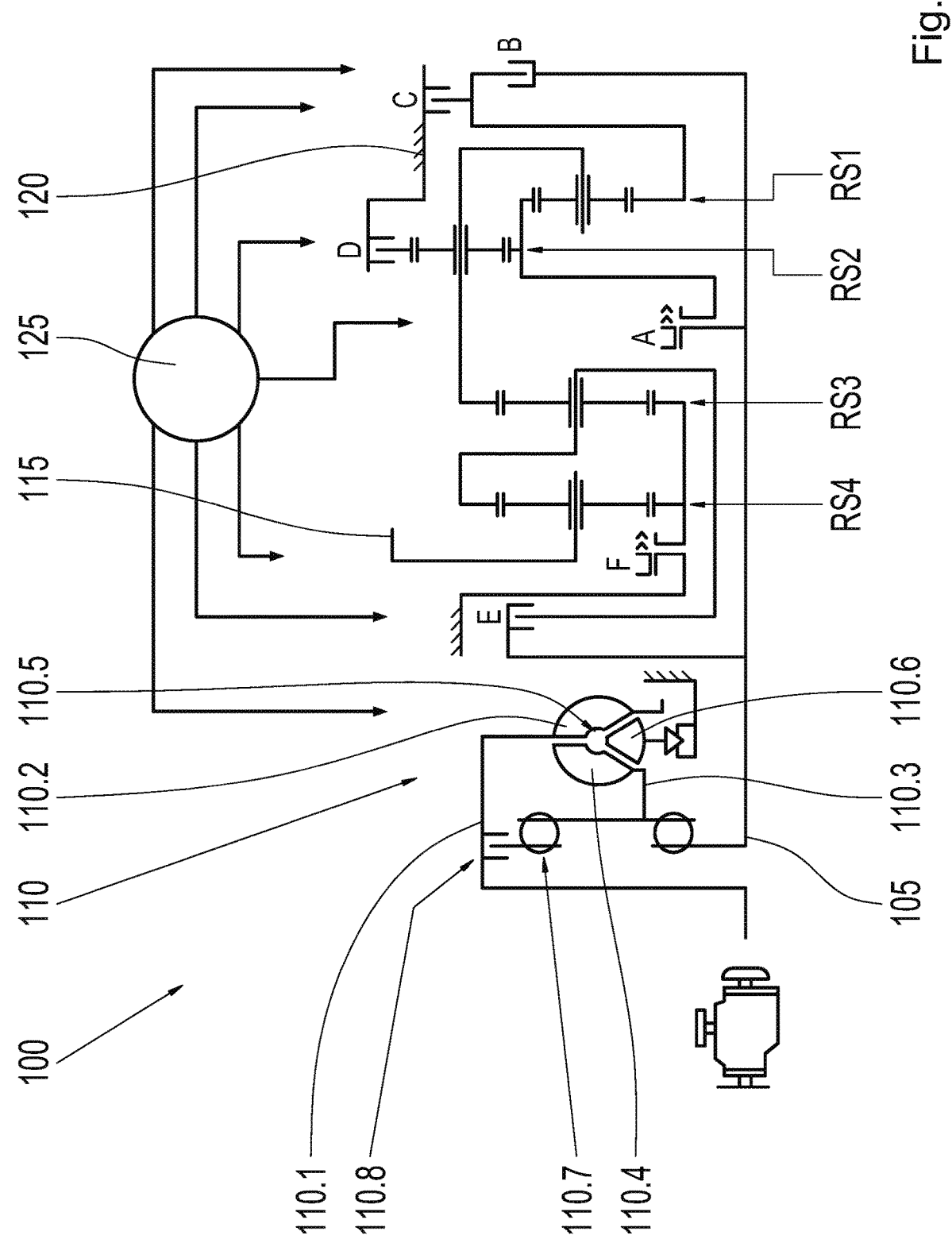
FIG. 1 shows a gearbox, for example, for use in a drive train of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic of an exemplary gearbox 100 which is designed as a multi-stage planetary transmission. A changeover of a gear step or ratio engaged in the gearbox 100 is preferably hydraulically controllable. The present invention is described with reference to the represented gearbox 100, although the present invention may also be utilized on other types of transmissions which permit a controlled engagement or disengagement of a gear ratio.

The gearbox 100 is designed, by way of example, as a 9-speed transmission including one reverse gear and may preferably be utilized in a motor vehicle. The gearbox 100 includes four gear sets RS1 through RS4, each of which may be implemented as an epicyclic system, in particular, in the form of planetary gear trains. An input shaft 105 is configured for connection to a prime mover or drive source. Optionally, a hydrodynamic torque converter 110 is provided between the prime mover and the input shaft 105. The torque converter 110 may be designed to be integral with the gearbox 100 or may be encompassed by the gearbox 100. An output shaft 115 of the gearbox 100 is preferably configured for connection to a driving wheel of the motor vehicle in a torque-transmitting manner.

The hydrodynamic torque converter 110 includes an input side 110.1 which drives a pump 110.2, and an output side 110.3 which is driven by a turbine 110.4. The coupling takes place with the aid of a fluid 110.5 which flows between the pump 110.2 and the turbine 110.4. Preferably, a stator 110.6 is provided in order to direct and, if necessary, control the fluid flow. The torque converter 110 is provided, in particular, as a launch clutch and may bring about an increase in torque depending on a slip between the input side 110.1 and the output side 110.3. A vibration damper 110.7 may be connected to the output side 110.3 in order to reduce torsional vibrations in the torque path. The vibration damper 110.7 may also be provided when the torque converter 110 is dispensed with. Usually, a torque converter lockup clutch 110.8 is provided in order to set the rotational speed difference between the input side 110.1 and the output side 110.3 to zero and, in this way, to minimize flow losses in the torque converter 110, in particular at higher rotational speeds, i.e., after a starting operation.

The gear sets RS1 through RS4 are interconnected in the manner shown, by way of example. Each gear set includes three elements which engage into one another with the aid of tooth systems. The radially innermost element is also referred to as the sun gear, the outermost element is referred to as the ring gear, and the element located therebetween is also referred to as the planet gear. The planet gear is mounted so as to be rotatable with respect to a planet gear carrier which, for its part, is mounted so as to be rotatable about the same axis of rotation as the sun gear and the ring gear. In the representation from FIG. 1, the axis of rotation (not represented) extends horizontally along the input shaft 105. Parts of the gear sets RS1 through RS4 located axially symmetrically below the axis of rotation, as well as their shafts, are not represented. If one of the elements sun gear, planet gear carrier, or ring gear is held, in particular, by way of being braked with respect to a transmission housing 120, the other two elements may be utilized for coupling and decoupling torque, wherein a predetermined step-up or step-down ratio is achieved.

For the open-loop control of a torque flow through the gear sets RS1 through RS4, a total of six shift elements A through F are available in the represented embodiment, each of which may be activated to be disengaged or engaged. The shift elements C and D each operate between a rotary element and the transmission housing 120 and are also referred to as brakes. The shift elements A, B, E and F each operate between two rotary elements and are also referred to as clutches. At least one of the shift elements A through F is preferably configured for being capable of disconnecting or connecting, in a proportionally controllable manner, a torque connection between a completely disengaged position and a completely engaged position. For this purpose, friction elements may be provided, which are pressed axially against one another in order to establish a variable frictional connection. An axial contact force may be brought about, in particular, hydraulically, for the purpose of which, for example, an electronic pressure regulator may adjust a hydraulic control pressure according to a control signal in order to control the level of the torque transmission.

In the present embodiment, at least the shift elements B through E are proportionally controllable in terms of their transmission behavior. The shift elements A and F, in particular, may be designed as form-fit shift elements which may only be completely disengaged or completely engaged. The following table shows an exemplary shift pattern. For each gear step, shift elements A through F which are engaged in order to engage the gear step are marked with a dot. The other shift elements A through F are disengaged.

| Gear step | C | D | B | E | F | A |
|---|---|---|---|---|---|---|
| 1 |   | • |   |   | • | • |
| 2 | • |   |   |   | • | • |
| 3 |   |   | • |   | • | • |
| 4 |   |   |   | • | • | • |
| 5 |   |   |   | • |   | • |
| 6 | • |   |   | • |   | • |
| 7 |   | • |   | • |   | • |
| 8 | • | • |   | • |   |   |
| 9 |   | • | • | • |   |   |
| R |   | • | • |   | • |   |

A changeover from an engaged gear step to another gear step requires the disengagement of at least one engaged shift element A through F and the engagement of at least one disengaged shift element A through F.

If, for example, the second gear step is engaged in the gearbox, torque is transmitted from the input shaft 105 via the shift element A to the ring gear of the first gear set RS1. The sun gear of the first gear set RS1 is connected to the housing 120 via the shift element C. The shift element D is disengaged, and so the second gear set RS2 transmits no torque. The torque made available by the first gear set RS1 at the planet gear carrier of the first gear set RS1 is transmitted to the ring gear of the third gear set RS3. Sun gears of the third gear set RS3 and of the fourth gear set RS4 are connected to the housing 120 via the shift element F. Torque is coupled from the planet gear carrier of the third gear set RS3 into the ring gear of the fourth gear set RS4. The output shaft 115 is driven by the planet gear carrier of the fourth gear set RS4.

In order to now engage the third gear step, the shift element B is engaged and the shift element A is disengaged. The functions of the gear sets RS2 through RS4 remain unchanged. As in the second gear step, the first gear set RS1 is driven via the ring gear and torque is made available via the planet gear carrier. The sun gear is now connected via the shift elements A and B to the ring gear, however, and so the step-down ratio of the first gear set RS1 is set to one.

In order to ensure a high level of shifting comfort or a high shifting speed, the condition changes at the shift elements A through F must be more precisely matched to one another. During a gear step changeover, two gear steps are usually intermittently simultaneously engaged and transmit torque, wherein at least one of the shift elements A through F is in the slip condition.

A control device 125 is configured for appropriately disengaging and engaging the shift elements A through F and, in this way, engaging a desired gear step in the gearbox 100. The shift elements A through F are usually hydraulically actuated, wherein a disengagement or engagement force and a disengagement or engagement position of a shift element A through F depend on an applied hydraulic pressure. An electronic pressure regulator is usually assigned to each shift element A through F for the open-loop control of the hydraulic pressure. A pressure regulator converts a predefined, usually electrical signal into a corresponding hydraulic pressure and may operate in the manner of a proportional valve, a control valve, or servo-valve. The control device 125 operates preferably electrically and may include a programmable microcomputer or microcontroller. A signal made available at an electronic pressure regulator may be present as a pulse-width modulated (PWM) signal.

The control device 125 determines control signals to be set for the shift elements A through F usually with respect to an event, the time, or a transmission parameter which may be sampled with the aid of a suitable sensor. Transmission parameters may include, for example, rotational speeds at different points of the gearbox 100, a hydraulic pressure, a torque to be made available or to be transmitted, a temperature, or a position of a shift element A through F. An event may be derived from one sampled parameter or from a combination of multiple sampled parameters. For example, it may be determined that a synchronization point is no longer met when a slip sets in at a shift element A through F and the friction elements have different rotational speeds. The fact that the synchronization point is no longer met may also be determined on the basis of a ratio of rotational speeds of the input shaft 105 with respect to the output shaft 110. If the ratio does not match a predetermined reduction ratio of a gear step, the synchronization point of this gear step is not met. An event may also be determined with reference to an external parameter, for example, when a signal regarding a changed driver demand, a changed operation of the prime mover, or a change in the drive train between the output shaft 115 and a driving wheel is acquired.

The processing unit 125 may predefine the hydraulic control pressure to be set for a shift element A through F in the form of a curve over time, which is also referred to as a control profile or gradient. For a predetermined sequence in the gearbox 100, for example, the changeover from the third gear step into the second gear step, multiple profiles, which are matched to each other, for the shift elements A through F are usually determined and made available. A changeover of the gear step may require a time of approximately a quarter (¼) second or less. Under certain circumstances, however, a changeover of the gear step may be extended for a longer time. A control profile may be composed of multiple portions which may be additively combined with one another. A portion may be static, in sections or completely, when it is dependent only on time and not on an event or a parameter. A portion may also be dynamic when there is a dependency on an event or a parameter. In this case, the control profile may be determined or changed while the control profile is already being utilized for the open-loop control of a shift element A through F. For example, a first portion may ensure the desired functionality in the first approximation, a second portion may represent a refinement, such as an increase in comfort, and a third portion may implement a further optimization in a special case, for example, during downshifting accompanied by a brake application at a driving wheel.

In order to assist the changeover of the engaged gear step, a demand to limit the torque provided by the prime mover to a predetermined value may also be transmitted to the prime mover connected to the input shaft 105.

Figure 2:
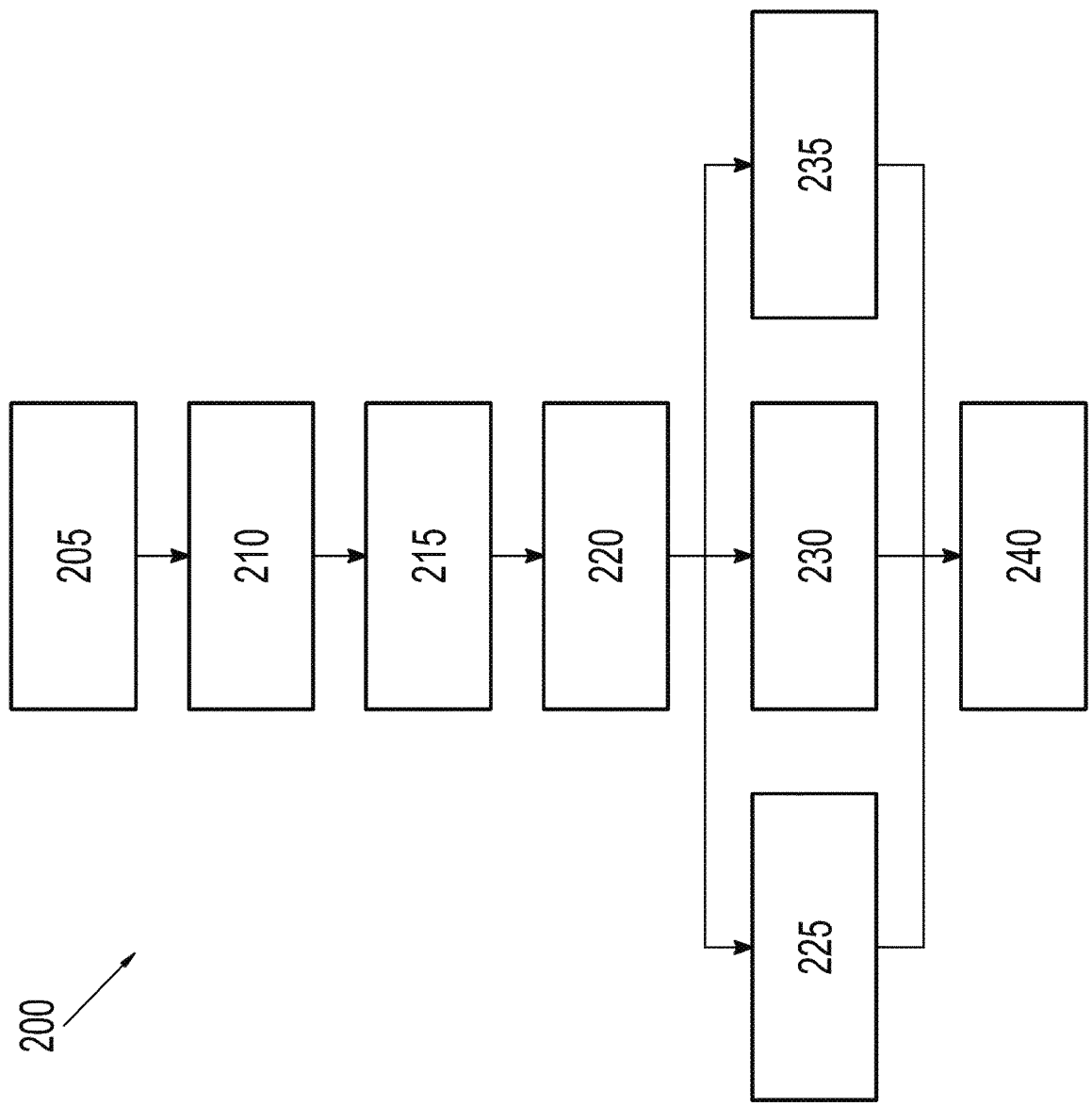
FIG. 2 shows a flow chart of a method for the open-loop control of a gearbox.

FIG. 2 shows a flow chart of a method 200 for the open-loop control of a gearbox 100. The method 200 may be utilized, in particular, in connection with a higher-order or interlaced method for the changeover of a gear step engaged in the gearbox 100. At 205, it is determined that a predetermined start condition has been met. The start condition may be, for example, a utilization of an HINSYN open-loop control or the presence of a condition required for the utilization of the HINSYN open-loop control. At 210, a desired specified differential speed profile is determined. The specified differential speed profile preferably includes the profile of a difference between the rotational speed of the input shaft of the gearbox and the synchronous speed of the gear step to be engaged. The specified differential speed profile may be determined, in particular, as a linear ramp with respect to zero, wherein a temporal length of the ramp may be determined from a predetermined slip time of a shift element contributing to the gear step changeover.

At 215, a closed-loop control deviation may be determined, which includes, in particular, the deviation of an actual differential speed profile from the specified differential speed profile. A parameter to be influenced may be determined on the basis of a torque to be transmitted and/or the determined closed-loop control deviation. Predetermined lower and/or upper threshold values may be predefined for the torque to be transmitted, for each of the available variants. In a first case, at 225, the influencing of a torque demand of a prime mover connected to the gearbox 100 is carried out. In a second case, the influencing of a shift element A through F engaging within the scope of the gear step changeover is carried out at 230 and, in a third case, the influencing of a disengaging shift element A through F is carried out at 235. The influencing may be carried out, in each case, as a function of the closed-loop control deviation, optionally even as a function of an additional control parameter. The determination of the specified differential speed profile at 210 may be repeated cyclically or periodically or in an event-controlled manner during the open-loop control. In addition, the decision for one of the steps 225 to 235 may be repeatedly reached during the open-loop control.

The influencing of the selected parameter preferably takes place for as long as it takes for a predetermined stop condition to be met at 240. The stop condition may include, for example, the input shaft 105 having reached a predetermined target synchronous speed. If the engaging shift element is form-fit, in particular, is in the form of a dog clutch, the stop condition may also require that the engaging shift element has been engaged. In the exemplary gearbox from FIG. 1, this may relate, in particular, to one of the shift elements A or F.

FIG. 3 shows exemplary profiles 300 of parameters with respect to a gearbox 100. Curves over time are graphically represented in a range on the left. Absolute values of variables of the gearbox 100 at a first point in time 305 and at a second point in time 310 are expressed numerically in a range on the right. The represented values were determined on a real, exemplary gearbox 100 during a downshift, which was also exemplary.

Profiles which are plotted are an actual rotational speed 315 of the input shaft 105, a measured differential speed 320 nd_syn with respect to the synchronous speed of the gear step to be engaged, a specified differential speed 325 nd_syn_soll_synreg with respect to the synchronous speed of the gear step to be engaged, a closed-loop control deviation 330 xd_synreg between the rotational speeds 320 and 325, a specified pressure profile 335 of the disengaging shift element A through F (PKAB), an ascertained control value 340 m_synreg after changeover via closed-loop control, an ascertained pressure control value 345 p_synreg, one further value 350, and yet another value 355. Exemplary time-dependent conditions 360 and 365 are plotted in a lower area of FIG. 3. The condition 360 assumes a high potential when the input shaft 105 has assumed a predetermined synchronous speed. Otherwise, the condition 360 assumes a low potential.

The changeover of the engaged gear step begins at a point in time t0. At a point in time t1, the synchronization described herein and, optionally, a HINSYN gear shift become active.

Modifications and variations can be made to the embodiments illustrated or described herein without departing from the scope and spirit of the invention as set forth in the appended claims.

REFERENCE CHARACTERS 100 gearbox
105 input shaft
110 hydrodynamic torque converter
110.1 input side
110.2 pump
110.3 output side
110.4 turbine
110.5 fluid
110.6 stator
110.7 vibration damper
110.8 torque converter lockup clutch
115 output shaft
120 transmission housing
A-F shift element
200 method
205 determine the start condition
210 determine the specified differential speed profile
215 determine the closed-loop control deviation
220 determine the parameters to be influenced
225 open-loop control of torque demand
230 open-loop control of control profile of engaging shift element
235 open-loop control of control profile of disengaging shift element
240 determine the stop condition
300 profiles
305 first point in time
310 second point in time
315 actual rotational speed of input shaft
320 measured differential speed with respect to the synchronous speed of the new gear step
325 specified differential speed with respect to the synchronous speed of the new gear step
330 closed-loop control deviation
335 specified pressure profile of the disengaging shift element
340 control value after changeover via closed-loop control
345 ascertained pressure control value
350 value
355 value
360 first condition
365 second condition

The invention claimed is:

1. A method (200) for open-loop control of a gearbox (100) that includes an input shaft (105), a first proportionally controllable shift element (A to F), and a second proportionally controllable shift element (A to F), the method (200) comprising:
 determining (210) a specified differential speed profile that is a profile of a difference between a rotational speed of the input shaft (105) and a synchronous speed of a gear ratio to be engaged;
 determining (225) a torque demand of a drive source connected to the input shaft (105) or determining (230, 235) a control profile for the one of the first and second shift elements (A to F) to be engaged in the gear ratio on the basis of the specified differential speed profile; and
 synchronizing the gearbox (100) based at least in part on one or both of the determined torque demand of the drive source and the determined control profile for the one of the first and second shift elements (A to F) to be engaged.

2. The method (200) of claim 1, wherein determining (210) the specified differential speed profile comprises determining (210) the specified differential speed profile with respect to a predetermined slip time.

3. The method (200) of claim 1, wherein the open-loop control (225-235) is performed such that an actual differential speed profile essentially corresponds to the specified differential speed profile, and the actual differential speed profile includes a profile of a difference between the rotational speed of the input shaft (105) and the synchronous speed.

4. The method (200) of claim 1, wherein the torque demand (225) and the control profile (230, 235) are determined with respect to different further control parameters, each of the different further control parameters determined as a function of one or both of a temperature of the gearbox and a torque to be transmitted.

5. The method (200) of claim 1, wherein the torque demand or the control profile is determined with respect to one further control parameter (225-235), and the one further control parameter (225-235) is determined as a function of a temperature of the gearbox (100).

6. The method (200) of claim 1, wherein the torque demand or the control profile is determined with respect to one further control parameter (225-235), and the one further control parameter (225-235) is determined as a function of a torque to be transmitted.

7. The method (200) of claim 1, wherein determining (225) the torque demand or determining (230, 235) the control profile begins when a start condition for an open-loop control is met, and the open-loop control holds the gearbox (100) at a synchronization point.

8. The method (200) of claim 1, wherein determining (225) the torque demand or determining (230, 235) terminates when the target synchronous speed is reached.

9. A device (125) for open-loop control of a gearbox (100) that includes an input shaft (105), a first proportionally controllable shift element (A to F), and a second proportionally controllable shift element (A to F), the device (125) comprises:
 an interface for connection to one of the first and second shift elements (A to F) or an interface for connection to a drive source which is connected to the input shaft (105);
 a processing unit (125); and
 a memory storing computer-executable instructions that, when executed by the processing unit (125), cause the processing unit (125) to perform operations comprising
  determining a specified differential speed profile that is a profile of a difference between a rotational speed of the input shaft (105) and a synchronous speed of a gear ratio to be engaged;
  determining a torque demand of the drive source or determining a control profile for one of the first and second shift elements (A to F) to be engaged in the gear ratio on the basis of the specified differential speed profile; and
  synchronizing the gearbox (100) based at least in part on one or both of the determined torque demand of the drive source and the determined control profile for the one of the first and second shift elements (A to F) to be engaged.

* * * * *